March 18, 1969     F. E. BUSCHBOM     3,433,204
BUNK FEEDER
Original Filed Oct. 22, 1965
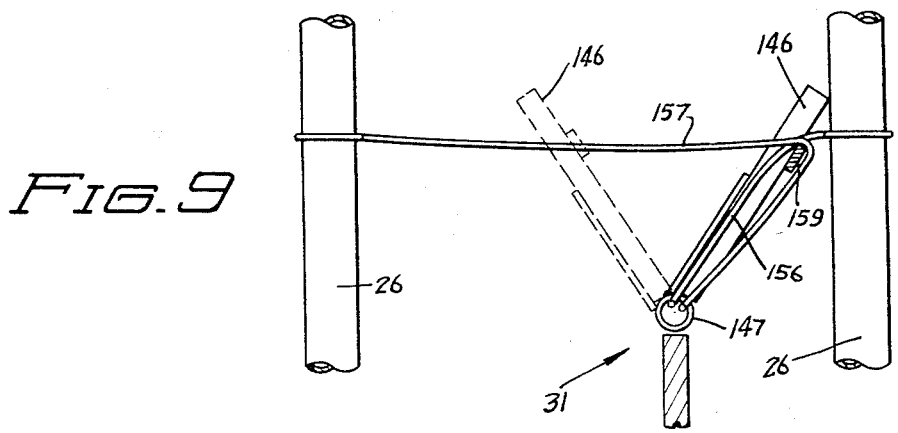
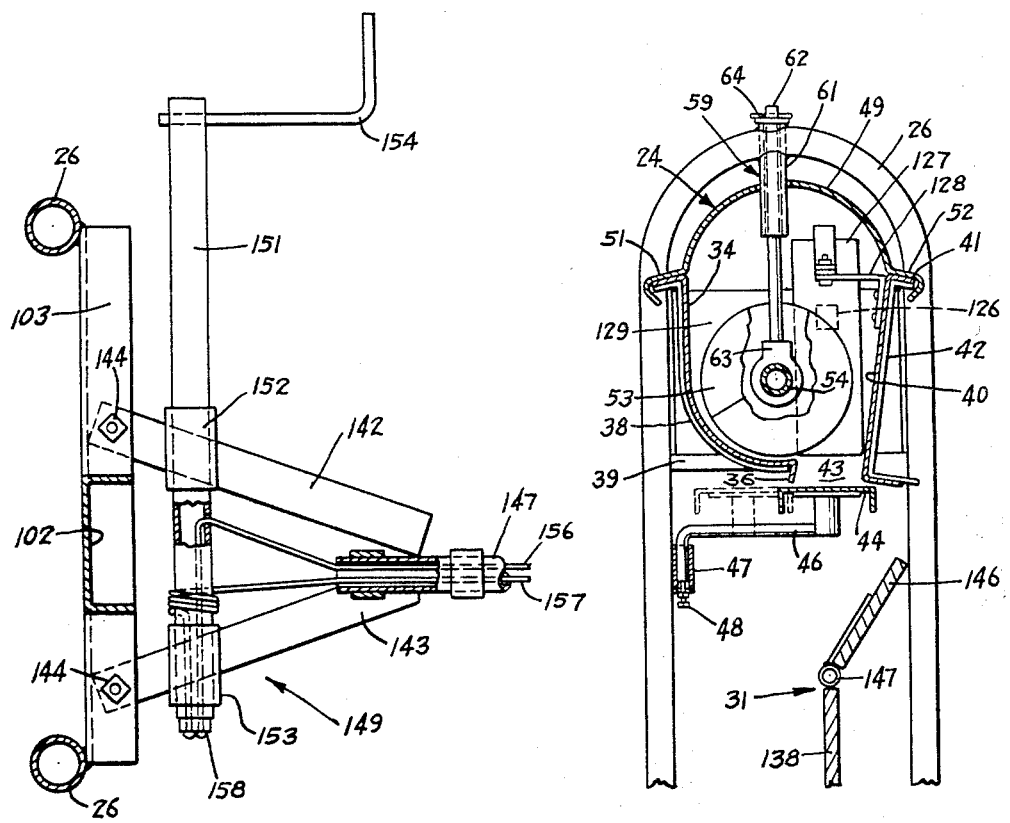
INVENTOR.
FLOYD E. BUSCHBOM
BY
Braddock+Burd
ATTORNEYS March 18, 1969  F. E. BUSCHBOM  3,433,204
BUNK FEEDER
Original Filed Oct. 22, 1965  Sheet 5 of 5
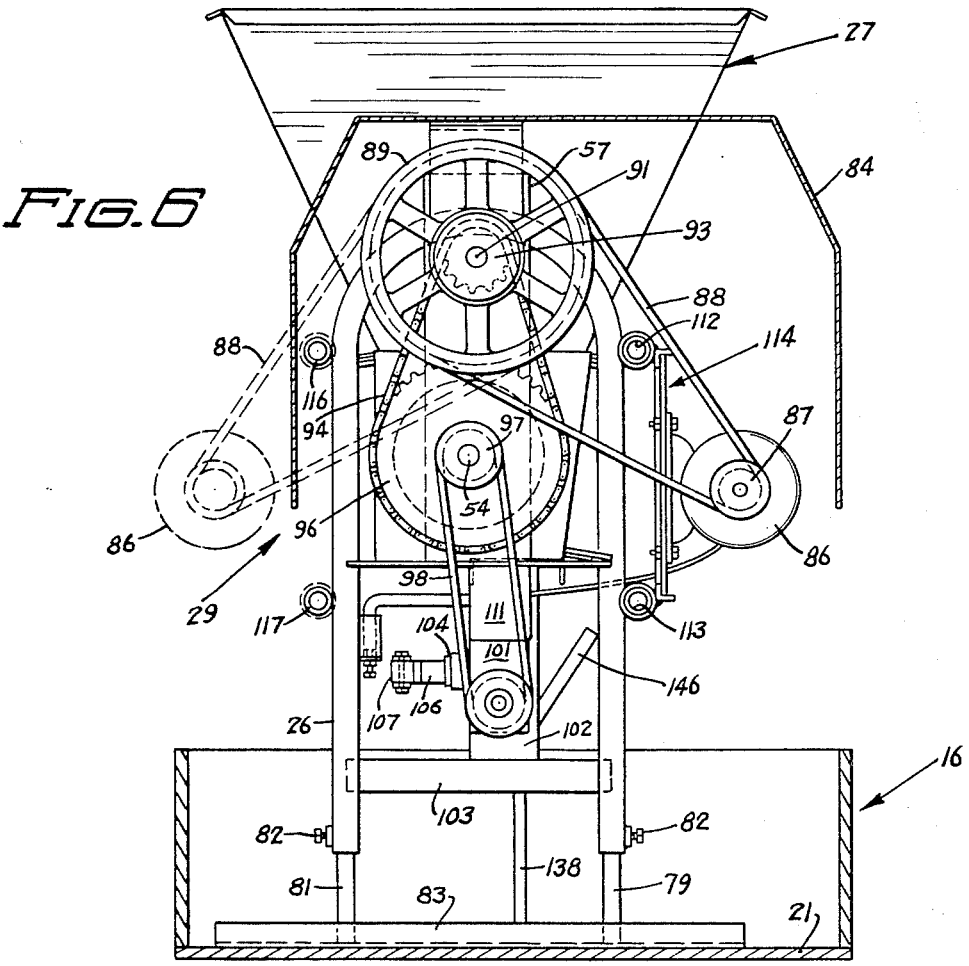
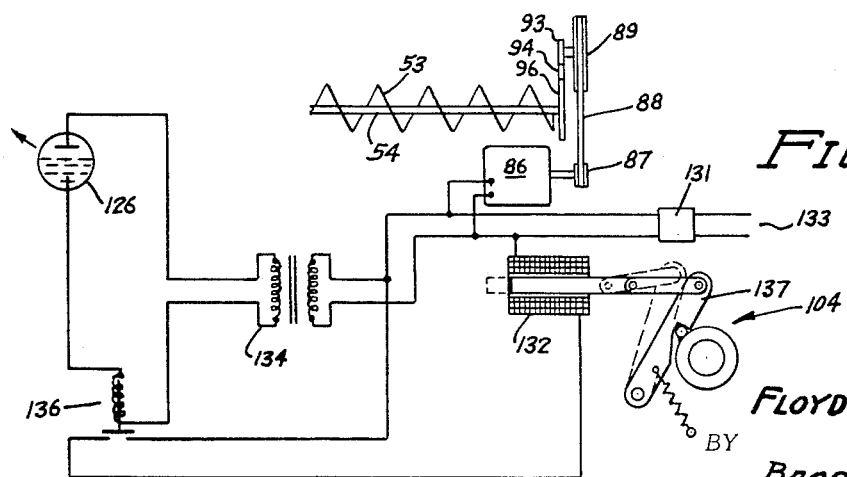
INVENTOR.
FLOYD E. BUSCHBOM
BY Braddock + Burd
ATTORNEYS

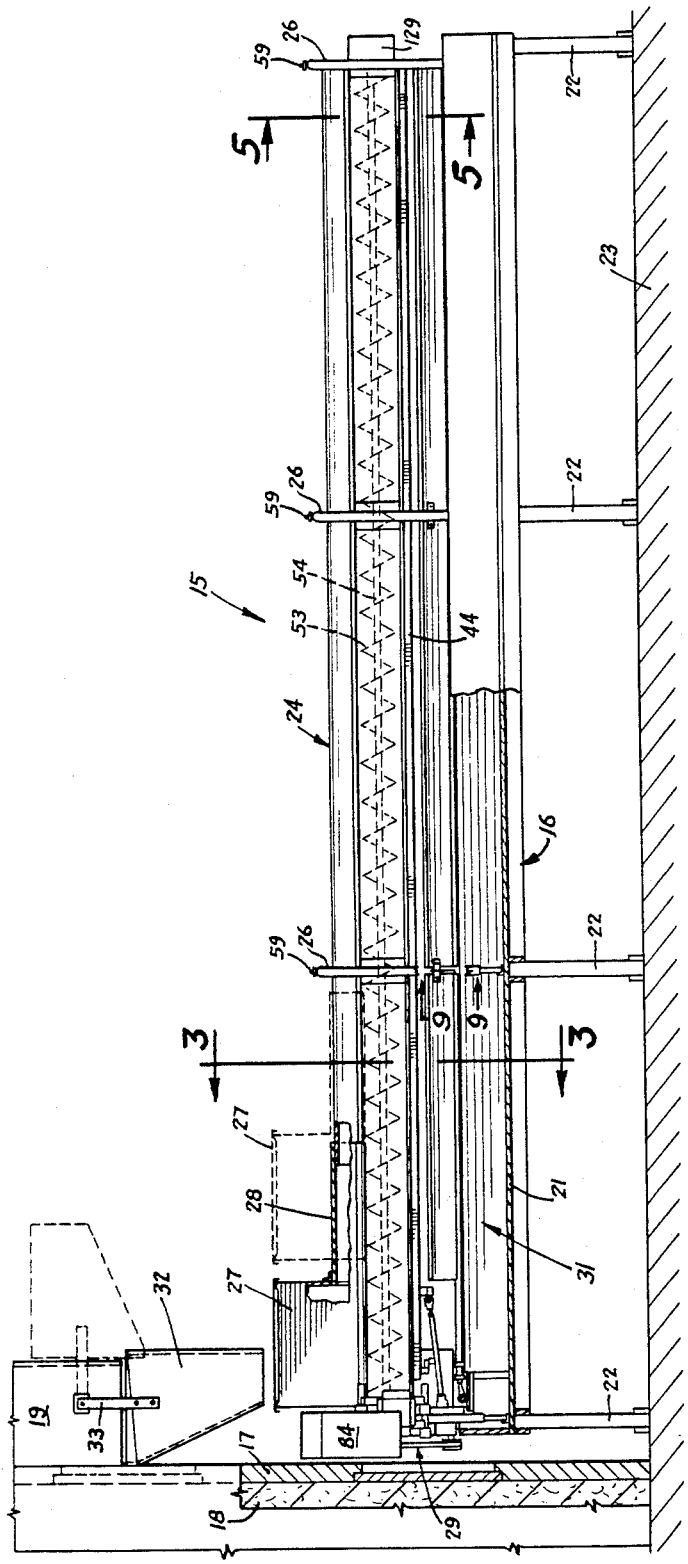

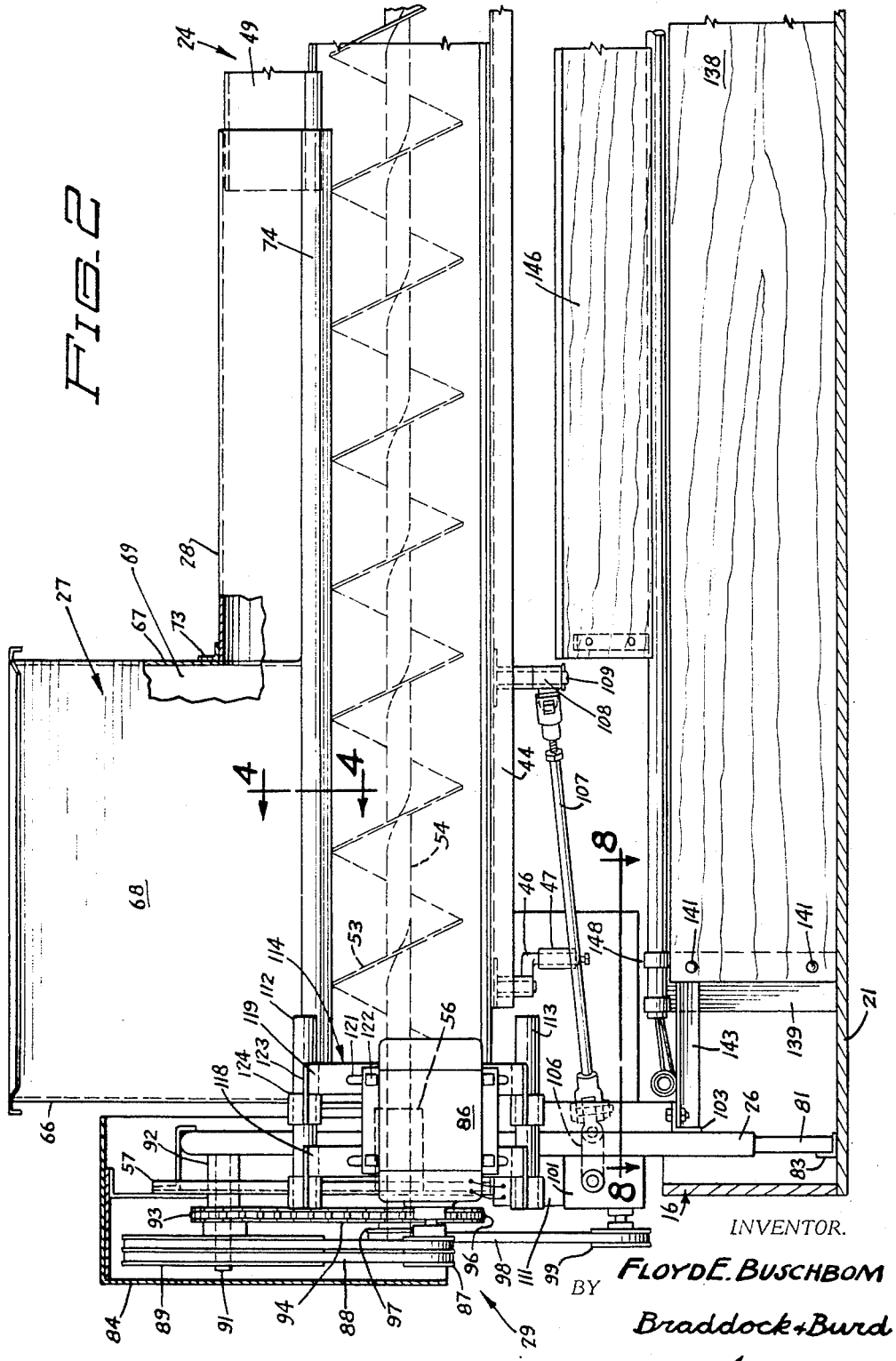

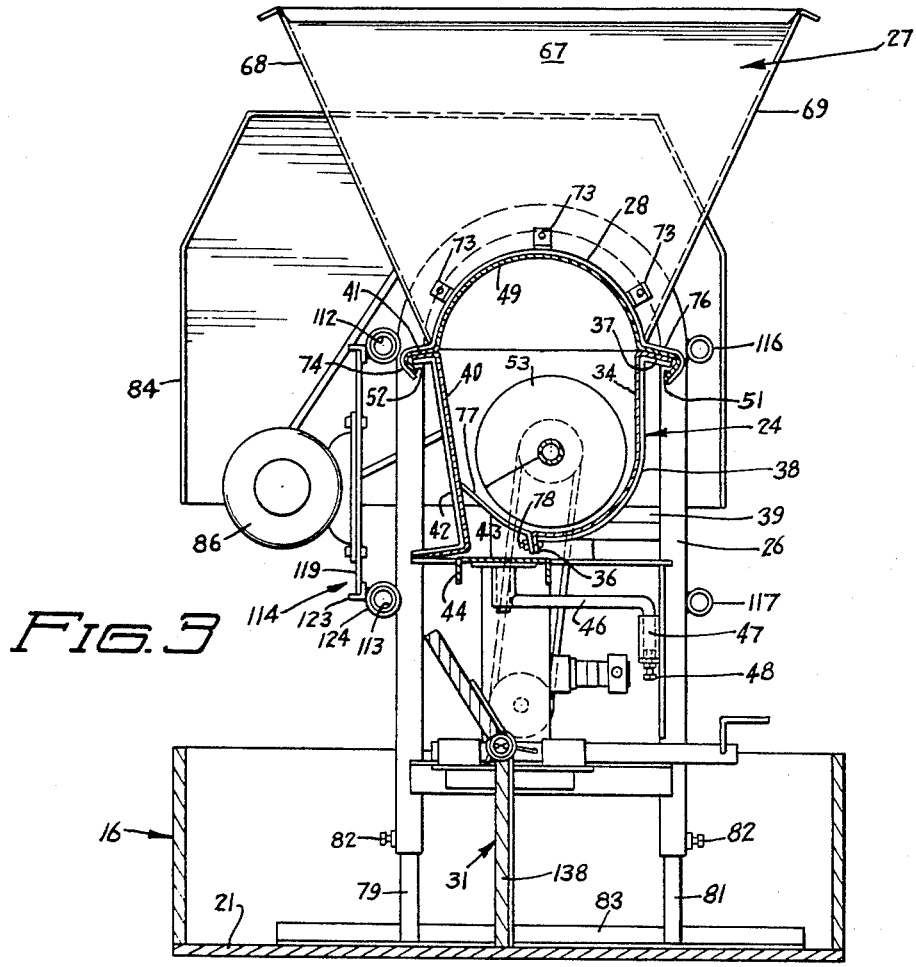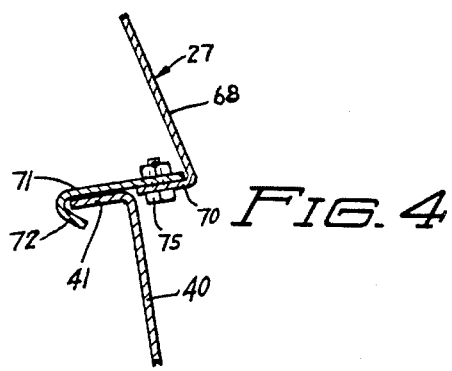

United States Patent Office 3,433,204
Patented Mar. 18, 1969

3,433,204
BUNK FEEDER
Floyd E. Buschbom, Long Lake, Minn., assignor to Van Dale Corporation, Wayzata, Minn., a corporation of Minnesota
Original application Oct. 22, 1965, Ser. No. 500,601, now Patent No. 3,318,287, dated May 9, 1967. Divided and this application Feb. 13, 1967, Ser. No. 615,447
U.S. Cl. 119—52                                            10 Claims
Int. Cl. A01k *5/00;* B65g *47/16*

ABSTRACT OF THE DISCLOSURE

A conveyor type bunk feeder having a motor for driving the conveyor that is mounted so it may be shifted on opposite sides of the feeder to permit access to the silo chute.

---

This application is a division of application Ser. No. 500,601 filed Oct. 22, 1965, now matured into Patent No. 3,318,287.

This invention relates to materials conveying and handling equipment and more particularly to an improved bulk feeder operable to convey bulk feed materials, such as livestock feeds, ensilage, haylage, grain, and the like, in an elongated path extended over a feeding surface and to discharge a major portion of the conveyed feed materials at substantially the same time to the feeding surface uniformly throughout the length of the bunk feeder.

Prior to the development of silo unloaders livestock ranchers manually fed cattle ensilage and similar feeds using shovels, carts, baskets and like hand tools. The ensilage, is normally stored in a tower silo having an upright chute defining an upright passage open at the base of the silo. In removing ensilage from the silo the rancher climbs into the silo through the chute passage using rungs or steps on the silo doors positioned in doorways open to the chute passage. The silage removed from the top surface of the silo is discharged or thrown into the chute and falls to the base of the silo. This ensilage is then distributed to mangers or feed bunks accessible to the livestock, such as cattle and sheep. This is a time consuming and a laborious feeding operation.

The mechanical silo unloader was developed to automatically remove ensilage from silo towers. In operation the silo unloader delivers the ensilage into the chute passage where it falls as a steady stream to the base of the silo. To complete the mechanization of the feeding operation mechanical conveyors known as bunk feeders were developed to transport and distribute this stream of ensilage to feed bunks or feeding surfaces. As the level of the ensilage in the silo is lowered by the silo unloader the rancher must periodically climb into the silo through the silo chute to remove the silo doors and reposition the silo unloader torque arm to insure the discharge of the feed or ensilage into the chute passage. This necessitates the partial removal of the bunk feeder from the bottom end of the chute to enable the rancher to permit access to the chute passage.

The feed materials handled by the bunk feeder varies from solids to liquids and may have heavy or light and compact or loose characteristics. A bunk feeder must convey and discharge these feed materials which may be extremely moist and in some instances a liquid slurry and at other times frozen and extremely hard. Under certain conditions the feed materials are dry, light and fluffy mixed with heavy material i.e., dry grass silage mixed with shelled corn and feed supplement. The bulk feeder to be effective must be adapted to operate with these wide types of feed materials.

It is the object of this invention to provide a bunk feeder which overcomes the disadvantages of the prior bunk feeders and is effectively operable to convey and discharge all types of feed materials to a feeding surface.

Another object of the invention is to provide a bunk feeder with a selectively movable hopper positionable under the chute of a silo for collecting and directing ensilage to the conveyor assembly of the bunk feeder and is movable relative to the conveyor assembly to permit access to the silo chute.

A further object of the invention is to provide a bunk feeder with compact and effective drive system which permits the positioning of the bunk feeder close to the silo wall.

Still another object of the invention is to provide a bunk feeder with motor mounting structure which permits the selective mounting of the motor on opposite sides of the bunk feeder.

A further object of the invention is to provide a bunk feeder having trough-like structure and a conveying unit, with cover means closing the conveying unit in the trough-like structure.

Still a further object of the invention is to provide a bunk feeder with a longitudinally movable hopper having a hood extension covering the longitudinal portion of a conveyor assembly.

Still another object of the invention is to provide an improved control structure for changing the position of a diverter board pivotally mounted below a discharge opening of a bunk feeder.

A further object of the invention is to provide a bunk feeder having trough-like structure and a conveying unit, with suspension means supporting the conveying unit in spaced and floating relation with respect to the trough-like structure and in combination with cover means for enclosing the conveying unit within the trough-like structure.

An additional object of the invention is to provide a rugged and versatile bunk feeder having low power requirements with high feeding capacity, relatively simple and economical in construction, readily installed in a practical and efficient manner substantially below the silo chute and which is reliable and effective in operation.

Other objects of the invention will become apparent as the description proceeds.

To the accomplishment of the foregoing and related ends, this invention then comprises the features hereinafter fully described and particularly pointed out in the claims, the following description sets forth in detail certain illustrative embodiments of the invention which are indicative of a few of the various ways in which the principles of the invention may be employed.

The invention is illustrated in the accompanying drawings in which the same numerals refer to corresponding parts and in which:

FIGURE 1 is a side view of the bunk feeder of this invention, partly sectioned, positioned on a feed bunk extended from a tower silo;

FIGURE 2 is an enlarged fragmentary side view of the drive end of the bunk feeder of FIGURE 1;

FIGURE 3 is a sectional view taken along the line 3—3 of FIGURE 1;

FIGURE 4 is an enlarged sectional view taken along the line 4—4 of FIGURE 2;

FIGURE 5 is an enlarged sectional view taken along the line 5—5 of FIGURE 1;

FIGURE 6 is an end elevational view of the drive end of the bunk feeder showing the alternate mount positions of the motor for operating the bunk feeder;

FIGURE 7 is a diagrammatic view of the electrical control system of the bunk feeder of FIGURE 1;

FIGURE 8 is an enlarged fragmentary sectional view taken along the line 8—8 of FIGURE 2; and FIGURE 9 is an enlarged sectional view taken along the line 9—9 of FIGURE 1.

Referring to the drawings, there is shown in FIGURE 1 the bunk feeder of this invention indicated generally at 15 positioned on a feed bunk 16 extended from a tower silo 17. The feed bunk 16 is a conventional cattle feeding structure and may be replaced by a feeding surface such as a concrete platform. The forward or material receiving end of the bunk feeder 15 is positioned adjacent the tower silo 17 used to store feed material 18 such as ensilage, haylage and the like. The bunk feeder 15 extends radially from the silo into an animal feed lot. The material receiving end of the bunk feeder is positioned below an upright silo chute 19 enclosing the silo doorways. The bunk feeder 15 together with the feed bunk 16 can be positioned tangentially of the silo 17 according to the location of the feed lot as the material receiving end of the bunk feeder is adapted to remain under the chute 19.

The feed bunk 16 is a box-shaped structure having a flat bottom wall 21 extended linearly below the bunk feeder 15. The wall 21 has a top feeding surface for holding feed material discharged by the bunk feeder 15. A plurality of upright legs 22 resting on a feed lot surface 23 support the feed bunk 16 at an elevation convenient to the feeding of animals.

The bunk feeder 15 comprises a conveyor assembly 24 extended linearly over the feed bunk 16 and supported thereon by a plurality of longitudinally spaced inverted U-shaped upright stands 26. A hopper 27 and hood or cover 28 is slidably supported on the material receiving end of the conveyor assembly 24 for movement longitudinally of the conveyor assembly. The hopper 27 is positioned below the upright silo chute 19 and collects the feed material discharged from the chute. A conveyor drive mechanism indicated generally at 29 supported on the forward end of the bunk feeder 15 functions to transport the feed material in a linear direction above the feed bunk 16 and to dum substantially all of the feed material in the conveyor assembly at the same time into the feed bunk 16. This simultaneous discharge of feed material into the feed bunk 16 eliminates crowding and congestion of animals at the feed bunk.

Positioned longitudinally along the bottom of feed bunk 16 is a material directing assembly 31 operable to selectively direct the falling dumped feed material to opposite sides of the feed bunk 16. This permits use of the bunk feeder 15 in a dual feed lot operation.

Pivotally mounted at the bottom of the silo chute 19 is a spout or funnel 32 directing the flow of feed material from the chute 19 into the hopper 27. Upright arms 33 secured to the opposite sides of the spout 32 pivotally mount the spout on the silo chute 19 for swinging movement completely from the bottom of the chute as shown in broken lines in FIGURE 1. This allows easy access to the chute 19. The sides of the spout 32 are beveled to assure easy flow of feed material and prevents the bridging of the feed material. The bottom end of the spout 32 located directly above the top of the hopper 27 directs the flow of the feed material into the hopper and minimizes loss from wind.

In the feeding operation feed material 18 is removed from the silo 17 by a silo unloader (not shown) such as the silo unloader shown and described in the patent to Cleaveland No. 3,130,707 issued Apr. 28, 1964. The silo unloader directs a continuous stream of material into the silo chute 19. The material in the chute 19 falls into the spout 32 which directs the material into the hopper 27. The material in the hopper 27 is guided in a downward direction into the conveyor assembly 24 which transports the material in a linear direction over the feed bunk 16. This feed material is stored in a substantially continuous ribbon along the entire length of the feed bunk 16. In response to the amount of material in the conveyor assembly 24 the drive mechanism 29 is actuated to effect a dumping of substantially all of the material at approximately the same time onto the bottom wall 21 of the feed bunk 16. The material directing assembly 31 diverts the feed material as it falls from the conveyor assembly 24 to one of the sides of the feed bunk 16.

As shown in FIGURES 3 and 5, the conveyor assembly 24 comprises a stationary housing enclosed about a movable conveyor unit. The housing comprises a J-shaped side wall 34 having a lower linear edge terminating in a downwardly projected lip 36. The upper edge of the side wall 36 has an outwardly directed linear top flange 37. A plurality of longitudinally spaced J-shaped brackets 38 cradled around the outside of the J-shaped side wall are secured to one side of the U-shaped stands 26 to mount the side wall 34 on the stands. Inwardly directed legs 39 connect the lower portions of the brackets 38 to the stands 26. Laterally spaced from the lip 36 is an upwardly and outwardly inclined side wall 40 having an outwardly directed linear top flange 41 positioned opposite the top flange 37 on the J-shaped side wall 34. Channel shaped brackets 42 secure the side wall 40 to the opposite sides of the U-shaped stands 26. The side wall 40 has a lower portion facing and spaced from the linear lip 36 defining therewith an elongated reservoir space or opening 43 for accumulating and storing feed material. The side walls 34 and 40 form a trough-like housing having an elongated opening 43 in the bottom section thereof. This reservoir space 43 is opened and closed by an elongated gate 44 positioned for movement in a horizontal plane below the J-shaped side wall 34. A plurality of arms 46 pivotally connected at one end to the gate and rotatably mounted at the opposite end in upright sleeves 47 secured to the U-shaped stands 26 support the gate 44 for movement in a substantially horizontal plane between an open position and a close position relative to the reservoir space 43 as shown in full and broken lines in FIGURE 5. As shown in FIGURE 5, bolts 48 project upwardly into the sleeves 47 to adjutably support the arms 46 in the sleeves 47. The movement of the gate 44 between the opened and closed positions is effected by the drive mechanism 29 and is described hereinafter.

The top space between the walls 34 and 40 is enclosed with an elongated cover or hood 49 having oppositely directed outward flanges 51 and 52 extended along the top surfaces in the side wall flanges 37 and 41 respectively. End portions of the flanges 51 and 52 are turned downwardly about the side wall flanges attaching snap fit cover 49 with a snap fit to the side walls 34 and 40. The cover 49 has an upright concave transverse curvature and is positioned below the top curved sections of the inverted U-shaped stands 26.

The movable conveyor unit is an elongated auger comprising a helical flight 53 secured to a shaft 54. As shown in FIGURE 2, one end of the shaft 54 is rotatably journalled in a sleeve bearing 56 secured to an upright plate 57 mounted on the end U-shaped stand 26. Each of the remaining stands 26 have hanger assemblies 59 for supporting the helical flight 53 for free upright movement, limited lateral movement and in spaced relation with respect to the bottom section of the J-shaped side wall 34. The hanger assemblies 59 are identical in construction and permit limited upright as well as limited lateral movement of the helical flight so as to prevent balling and clogging of the feed material in conveyor assembly.

As shown in FIGURE 5, hanger assembly 59 comprises a downwardly projected tubular member 61 secured to the mid-portion of the inverted U-shaped stand 26. An upright rod 62 projects through the tubular member 61. The rod 62 has a diameter which is smaller than the inside diameter of the tubular member 61 to permit limited lateral movement of the rod in the tubular member. A bearing 63 positioned about a portion of the shaft 54 is secured to the lower end of the rod 62. Downward movement of the rod 62 with respect to the inverted U- shaped stand 26 is limited by a washer and cotter key assembly 64 secured to the upper end of the rod. The washer and cotter key assembly maintain the helical flight 53 in spaced relation with respect to the J-shaped side wall 34. To provide for vertical adjustment of the helical flight 53 with respect to the bottom portion of the J-shaped wall 34 a nut may be threaded onto the upper end of the rod 62 in lieu of the cotter key.

The hopper 27 is movably positioned on the material receiving end of the conveyor assembly 24 and comprises a V-shaped housing having upright end walls 66 and 67 joined to downwardly converging side walls 68 and 69. Hopper 27 has an open top and open bottom and functions as a funnel to direct feed material into the conveyor assembly 24. Side walls 68 and 69 have outwardly directed flanges 70 along the lower edges thereof. Plates 71 secured to flanges 70 rest on the top surfaces of the side wall flanges 37 and 41. As shown in FIGURE 4, bolts 75 secure plate 71 to flange 70. Plate 71 terminates in a downwardly and inwardly projected lip 72 positioned around the end of the flange 41 to limit the upward movement of the hopper 27. The plate secured to side wall 69 has a similar lip. The linear conveyor flanges 37 and 41 function as guides and supports for the hopper plates 71 directing the movement of the hopper 27 longitudinally of the conveyor 24 away from the silo 17 as shown in broken lines in FIGURE 1.

As shown in FIGURES 2 and 3, the lower section of the hopper end wall 67 has an upwardly extended semicircular opening of a size and shape of the transverse curvature of the hood 28. The hood 28 extends laterally from the end wall 67 and is secured thereto by angle brackets 73. Projected outwardly from the opposite sides of the hood 28 are flanges 74 and 76 having end sections turned around the flanges 51 and 52 of the cover 49. As shown in FIGURE 2, in the closed position the hood 28 has a length sufficient to overlap the adjacent end of the cover 49. When the hopper 27 is in the closed position the hood 28 functions to keep the top of the conveyor closed as it has a length which is longer than the longitudinal distance between the end of the cover 49 and the hopper end wall 67. This enables the hopper 27 to be moved to the open position as shown in broken lines in FIGURE 1 without interference from the cover 49 as the hood 28 rides over the cover.

To prevent the accumulation of feed material on the gate 44 at the material receiving end of the conveyor assembly 24 the reservoir space 43 is closed by a plate member 77 having a downwardly projected flange positioned adjacent the lip 36 of the side wall 34. Bolt and nut assemblies 78 secure the plate member 77 to the side wall 34. The plate member 77 has a length which is slightly longer than the length of the hopper 27.

The conveyor assembly 24 together with the hopper 27 is adjustably supported above the feed bunk 16 by the inverted U-shaped stands 26. The lower ends of the stands 26 telescope over upright supports 79 and 81 and are adjustably secured thereto by set screws 82. Secured to the lower ends of supports 79 and 81 are transverse angle members 83 positioned on the bottom wall 21 of the feed bunk.

Referring to FIGURE 6, the drive mechanism 29 is located under a safety shield 84 and comprises an electric motor 86 having a drive pulley 87. A pair of V-belts 88 are trained over the pulley 87 and a large pulley 89 mounted on a jack shaft 91. As shown in FIGURE 2, the shaft 91 is journalled in a sleeve bearing 92 mounted on the upper portion of the plate 57. Integral with the hub of the pulley 89 is a small sprocket 93 carrying a roller link chain 94 trained over a large sprocket 96 secured to the end of the auger shaft 54 projected through the bearing 56. Secured to the outer side of the sprocket 96 is a pulley 97 carrying a V-belt 98 trained over a power input pulley 99 of a speed reduction transmission 101. As shown in FIGURE 6, the transmission 101 is mounted on an upright plate 102 attached to a transverse beam 103. Opposite ends of the beam 103 are secured to the lower ends of the U-shaped stand 26. Mounted on the output shaft of the transmission 101 is a clutch mechanism 104 for driving a crank arm 106 intermittently. The details of the clutch mechanism 104 form part of the subject mater of applicant's co-pending application Ser. No. 415,671, filed Dec. 3, 1964 and are incorporated herein by reference.

Pivotally attached to the outer end of the crank arm 106 is an elongated pitman arm 107 extended under the gate 44. As shown in FIGURE 2, the outer end of the pitman arm 107 carries a coupling having an upright sleeve 108 positioned about a downwardly projected pin 109 secured to the bottom of the gate 44. Rotation of the crank arm 106 applies a force to the pitman arm 107 causing the gate 44 to horizontally swing to open and closed positions as shown in broken and full lines in FIGURE 5.

An electrical control box 111 is mounted on top of the transmission 101 and contains the controls for the clutch mechanism 104. The detail of these controls are described hereinafter.

As shown in FIGURE 6, in broken and full lines, the electric motor 86 may be selectively mounted adjacent opposite sides of the bunk feeder. The motor 86 is mounted on a motor mount indicated generally at 114. A pair of vertically spaced tubular bars 112 and 113 secured to one side of the end inverted U-shaped stand 26 are used to detachably support the motor mount 114 on the stand. The opposite side of the inverted U-shaped stand 26 has a pair of similar tubular bars 116 and 117 for accommodating the motor mount 114. The tubular bars 116 and 117 opposite the motor 86 serve as horizontal rungs usable by the farmer to climb up into the silo chute 19.

As shown in FIGURE 2, the motor mount 114 has a pair of upright plate members 118 and 119 formed with longitudinal slots 121 providing upright passageways for bolts 122 used to secure the motor 86 to the plate members 118 and 119. On the outer ends of each of the plate members 118 and 119 there is secured horizontally disposed right angle members 123. A sleeve 124 secured to each of the angle members 123 is telescoped over the tubular bars 112 and 113 as shown in FIGURES 2 and 3. The sleeves 124 secured to the respective plate members 118 and 119 respectively are located on opposite sides of the inverted U-shaped stand 26 and are removed therefrom in opposite directions after the uncoupling of at least two of the motor mounting bolts 122.

The clutch mechanism 104 is actuated to effect a drive between the transmission 101 and the pitman arm 107 in response to the amount of and the movement of bulk feed material in the conveyor assembly 24. The feed material in the conveyor assembly actuates a switch 126 shown in FIGURE 5 as mounted on an upright door 127. The switch 126 is a mercury unit operable on outward pivotal movement of the door 127 to trip to an on position so as to actuate the electrical control system of the clutch mechanism. The door 127 is an upright plate positioned adjacent the end of the reservoir space 43 and pivotally mounted for movement about a transversely extended horizontal axis on a bracket 128 secured to the side wall 40. As shown in FIGURES 1 and 5, the switch 126 and door 127 are positioned behind a protective U-shaped shield 129 secured to the legs of the last inverted U-shaped stand 126.

The electrical control system for the bunk feeder, shown in FIGURE 7, comprises a control switch 131, such as a manually operated on-off switch or an automatic timing on-off switch, for coupling the electric motor 86 and solenoid 132 to an electrical power source 133, such as a 110 volt line. The electrical energy supply to the mercury switch 126 is reduced to approximately 24 volts by a transformer 134. The mercury switch 126 is interposed in a line connecting the transformer 134 to a relay switch 136 interposed in a line connecting the solenoid 132 to the control switch 131. When the mercury switch 126 is in the closed position the relay 136 is closed so as to connect the solenoid 132 with the electrical power source 133. Energization of the solenoid 132 releases the clutch mechanism moving a clutch pawl 137 to the release position, shown in broken lines, thereby permitting automatic engagement of the clutch mechanism 104.

On engagement of the clutch mechanism 104 crank arm 106 rotates a complete circle moving the pitman arm 107 which in turn swings the gate 44 in a horizontal plane to the open position as shown in broken lines in FIGURES 3 and 5. With the gate 44 open substantially all of the bulk feed material in the conveyor assembly 24 and stored in the reservoir space 43 are discharged into the feed bunk 16 uniformly along the entire length thereof. This simultaneous and substantially uniform discharge of the feed into the bunk feeder eliminates crowding of cattle at the bunk feeder.

The material discharged from the conveyor assembly 24 can be selectively directed to opposite sides of the feed bunk 16 by the material directing assembly 31. As shown in FIGURES 2 and 3, the material directing assembly 31 comprises an upright board member 138 extended longitudinally along the feed bunk 16 dividing the feed bunk into two separate feeding areas. The end of the board member 138 is secured to an upright support 139 by bolt and nut units 141. Similar upright supports attached to the transverse angle members 83 are secured to the board member 138. A pair of diverging brace members 142 and 143 secured by bolt and nut units 144 to the transverse beam 103 are attached to the upper end of the upright support 139.

A swingable diverter board 146 extended linearly along the top of the upright board member 138 is secured to an elongated tubular member 147. Strap members 148 looped about tubular member 147 are secured to the upright support 139. This pivotally mounts the tubular member 147 above board member 138 and enables the diverter board 146 to be angularly moved to a left inclined position and a right inclined position as shown in dotted and full lines in FIGURE 9.

The position of the diverter board 146 is controlled by a manually operated winch indicated generally at 149 in FIGURE 8. The winch comprises a transversely disposed tubular member 151 rotatably carried in a pair of sleeves 152 and 153 mounted on the tops of the brace members 142 and 143. The outer end of the tubular member 151 carries a hand crank 154 used to rotate the member 151. A pair of cables 156 and 157 extend through the tubular member 147 and are threaded through suitable holes in the transverse tubular member 151 from opposite sides thereof. A clamp 158 secured to the ends of the cables 156 and 157 fix the cables with the tubular member 151.

As shown in FIGURE 9, the cables 156 and 157 emerge from the tubular member 147 and extend about opposite sides of a connecting bar 159 used to connect adjacent diverter board members 146. Cable 157 is connected to one leg of the U-shaped stand 26 while cable 156 is connected to the opposite leg of the stand.

Referring to FIGURE 8, the cables 156 and 157 are connected to the transverse tubular member 151 in a manner such that on rotation of the member 151 one cable is wound upon the member 151 while the other cable is unwound from the member 151, thus the cable that is wound on the member is shortened while the cable that is unwound from the member is lengthened. The effect of this operation is swinging movement of the diverter board 146 as indicated in FIGURE 9. With the diverter board member 146 located below the reservoir space 43 of the conveyor assembly 24 the material as it falls from the conveyor assembly will be directed to opposite sides of the feed bunk 16.

The material conveying and handling machine of this invention has been described as a bunk feeder for feeding agricultural materials to animals. This use is not to be construed as limiting the invention to bunk feeders or machines that discharge feed to domestic creatures, as livestock, hogs and fowl. The disclosed material conveying and handling machine is adapted to operate to convey and deposit bulk materials other than agricultural bulk feeds.

It is apparent that many modifications and variations of this invention as hereinbefore set forth may be made without departing from the spirit and the scope thereof. The specific embodiments described are given by way of example only.

The embodiments of the invention in which an exclusive property or privilege is claimed are defined as follows:

1. In a bunk feeder a conveyor assembly including a movable member, stand members for supporting the conveyor assembly above a feeding location, one of said stand members located adjacent one end of the conveyor assembly, power trasmitting means connected to the movable member of the conveyor assembly, a motor for applying power to the power transmitting means, and support means for selectively mounting said motor on opposite sides of said one stand member.

2. The bunk feeder structure defined in claim 1 wherein said support means includes at least a pair of vertically spaced horizontal members secured to each side of said one stand member.

3. The bunk feeder structure defined in claim 1 wherein said support means comprises a pair of vertically spaced horizontal members secured to each side of said one stand member, a pair of upright plate members extended between one pair of said horizontal members, each of said plate members having upright slots for accommodating motor mounting means attaching the motor to said plate members, sleeves secured to said plate members, said sleeves adapted to telescope over said horizontal members whereby the motor can be selectively mounted on opposite sides of said one stand member.

4. The bunk feeder of claim 1 wherein said one stand member located adjacent one end of the conveyor assembly includes upright legs located on opposite sides of the conveyor assembly, and said support means includes a plurality of vertically spaced horizontal members secured to each of said upright legs and means for selectively mounting the motor on the horizontal members on one side of the conveyor assembly, the horizontal members on the opposite side of the conveyor assembly being exposed for use as rungs to climb the conveyor assembly.

5. The bunk feeder of claim 4 wherein said means for selectively mounting the motor on the horizontal members includes upright members extended between the horizontal members on one side of the conveyor assembly, means for mounting the motor on the upright members and means for attaching the upright members to the horizontal members.

6. The bunk feeder of claim 5 wherein the means for attaching the upright members to the horizontal members comprise sleeve means secured to the upright members, said sleeve means adapted to telescope over the horizontal members whereby the motor can be selectively mounted on opposite sides of the conveyor assembly.

7. In a bunk feeder, at least one stand member having spaced upright legs, at least a pair of vertically spaced horizontal members secured to each of said upright legs, upright members having openings to accommodate motor mounting means for securing a motor to the upright members, and sleeve means secured to said upright members, said sleeve means coacting with horizontal members on either of said legs whereby the motor can be selectively mounted on opposite sides of said upright stand member.

8. A support for a motor comprising a first upright means and a second upright means spaced from the first upright means for selectively positioning the motor at elevated locations, a first plurality of vertically spaced generally horizontal members secured to said first upright means, a second plurality of vertically spaced generally horizontal members secured to said second upright means, and means for selectively mounting the motor on either the first horizontal members or the second horizontal members whereby the motor is carried by one of said plurality of horizontal members and the other of said plurality of horizontal members providing rungs for climbing.

9. The support of claim 8 wherein said means for selectively mounting the motor on one of the horizontal members includes upright members extended between the one of the horizontal members, means for attaching the motor to the upright members, and means for coupling the upright members to said one of the horizontal members.

10. The support of claim 9 wherein said means for coupling the upright members to said one of the horizontal members comprise sleeve means secured to the upright members, said sleeve means adapted to coact with said one of the horizontal members whereby the motor can be selectively mounted on either upright means.

References Cited

UNITED STATES PATENTS

| | | | |
|---|---|---|---|
| 2,689,100 | 9/1954 | Voigt | 248—16 |
| 2,763,521 | 9/1956 | Fuge | 248—13 |
| 2,944,433 | 7/1960 | Myers | 248—16 X |
| 2,976,745 | 3/1961 | Bade | 248—16 |
| 3,130,707 | 4/1964 | Cleaveland | 119—52 |
| 3,134,478 | 5/1964 | Haen et al. | 198—64 |
| 3,176,832 | 4/1965 | Wilkes | 198—213 |
| 3,184,190 | 5/1965 | Halfinger | 248—13 |
| 3,191,753 | 6/1965 | Kirkpatrick | 19—52 X |
| 3,197,016 | 7/1965 | Jones | 119—56 X |

ALDRICH F. MEDBERY, *Primary Examiner.*

U.S. Cl. X.R.

198—64; 248—16